US011771232B2

(12) United States Patent
Bangalore et al.

(10) Patent No.: US 11,771,232 B2
(45) Date of Patent: Oct. 3, 2023

(54) MODULAR FURNITURE WITH TOOL FREE ASSEMBLY

(71) Applicants: Venkataramu Bangalore, Plano, TX (US); Zachariah Dannett, Los Angeles, CA (US); Chin Jin Yap, West Hill, CA (US)

(72) Inventors: Venkataramu Bangalore, Plano, TX (US); Zachariah Dannett, Los Angeles, CA (US); Chin Jin Yap, West Hill, CA (US)

(73) Assignee: NOBLE HOUSE HOME FURNISHING LLC, Chatsworth, CA (US)

( * ) Notice: Subject to any disclaimer, the term of this patent is extended or adjusted under 35 U.S.C. 154(b) by 0 days.

(21) Appl. No.: 17/575,503

(22) Filed: Jan. 13, 2022

(65) Prior Publication Data

US 2022/0211183 A1    Jul. 7, 2022

Related U.S. Application Data

(63) Continuation-in-part of application No. 17/135,210, filed on Dec. 28, 2020, now abandoned, which is a continuation of application No. 16/560,641, filed on Sep. 4, 2019, now Pat. No. 10,905,245.

(60) Provisional application No. 62/728,706, filed on Sep. 7, 2018.

(51) Int. Cl.
*A47C 13/00* (2006.01)
*A47B 96/20* (2006.01)
*A47C 4/02* (2006.01)

(52) U.S. Cl.
CPC .......... *A47C 13/005* (2013.01); *A47B 96/201* (2013.01); *A47C 4/02* (2013.01); *A47B 2230/0081* (2013.01)

(58) Field of Classification Search
CPC . A47C 13/005; A47C 4/02; A47B 2230/0081; A47B 96/201; F16B 12/26; F16B 2012/443; F16B 12/125
USPC ............................................. 297/440.14, 248
See application file for complete search history.

(56) References Cited

U.S. PATENT DOCUMENTS

| | | | | | |
|---|---|---|---|---|---|
| 4,077,666 | A | * | 3/1978 | Heumann | A47C 13/005 D6/377 |
| 4,140,065 | A | * | 2/1979 | Chacon | F16B 12/20 297/440.13 |
| 6,305,750 | B1 | * | 10/2001 | Buono | A47C 7/425 297/440.1 |
| 7,014,267 | B1 | * | 3/2006 | Nagar | A47C 13/005 297/440.14 |
| 2009/0058155 | A1 | * | 3/2009 | Bartlmae | A47C 1/124 297/248 |
| 2016/0278529 | A1 | * | 9/2016 | Paterson | A47C 4/03 |

* cited by examiner

*Primary Examiner* — Milton Nelson, Jr.
(74) *Attorney, Agent, or Firm* — Colin P. Abrahams

(57) ABSTRACT

A modular furniture piece with integrated connectors comprises a first module with a plurality of first integrated connectors selectively located thereon. A second module is provided for fastening to the first module, and the second module has a plurality of second integrated connectors located thereon. The first integrated connectors register with the second integrated connectors when the first module and the second module are positioned with respect to each other in their assembled orientation.

19 Claims, 18 Drawing Sheets

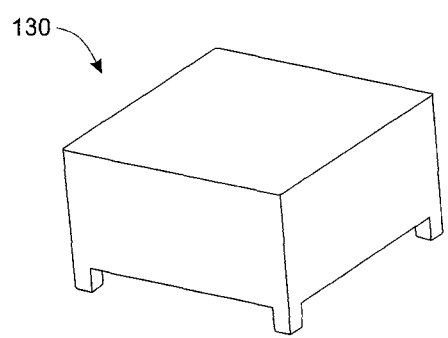
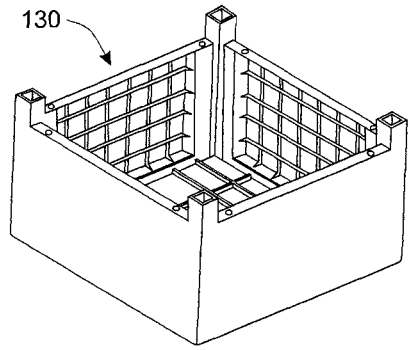
FIGURE 10A
FIGURE 10B
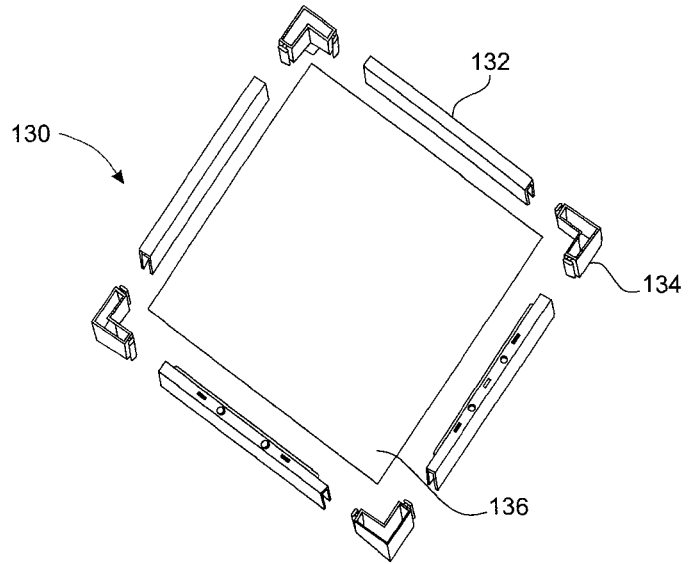
FIGURE 10C

MODULAR FURNITURE WITH TOOL FREE ASSEMBLY

CROSS-REFERENCE TO RELATED APPLICATIONS

This application is a continuation in part of U.S. patent application Ser. No. 17/135,210 filed Dec. 28, 2020, which is a continuation application of U.S. patent application Ser. No. 16/560,641 filed Sep. 4, 2019, which claims the benefit of United States Provisional Patent Application No. 62/728,706 filed Sep. 7, 2018, the contents of which are incorporated herein in their entirety.

FIELD AND BACKGROUND OF THE INVENTION

This application relates to modular furniture with tool free assembly. The invention relates to an item of furniture comprised of portions or modules to be assembled, each of the portions or modules incorporating structure which facilitates the connection between portions or modules, preferably in a manner which does not require any tools or other conventional hardware typically used in such assemblies, such as pins, bolts, nuts, screws and the like.

The invention thus relates to structures and different methods for assembling furniture, such as outdoor furniture, preferably without the need of any separate, independent or discrete fasteners or other such hardware to hold all of the components securely to each other in a stable and reliable manner. Most of the outdoor furniture currently available, where assembly is necessary by the purchaser or consumer, must be assembled using multiple fasteners which may be of different sizes and shapes. This can often require the need for some knowledge and understanding as to how these various fasteners may work. A disadvantage in such situations is that the loss, absence or damage of any one fastener or piece, or the fact that it may have been missing from the original packaging, can hamper and delay the assembly process causing frustration and dissatisfaction.

In these conventional furniture assembly products, the fasteners may be constructed out of metal, plastic or other material which performs similarly, and a plurality of screws and bolts and nuts of slightly different sizes, shapes and configurations may be somewhat confusing, as well as a challenge for people who may be mechanically less inclined.

SUMMARY OF THE INVENTION

According to one aspect of the invention, there is provided a modular furniture piece with integrated connectors, the modular furniture piece comprising: a first module having a plurality of first integrated connectors selectively located thereon; a second module for fastening to the first module, the second module having a plurality of second integrated connectors located thereon, the first integrated connectors registering with the second integrated connectors when the first module and the second module are positioned with respect to each other in their assembled orientation.

In one embodiment, the first module comprises a plurality of third integrated connectors selectively located thereon, the third integrated connectors having a different configuration to the first integrated connectors, and the second module comprises a plurality of fourth integrated connectors, the third integrated connectors registering with the fourth integrated connectors when the first module and the second module opposition with respect to each other in their assembled orientation.

In another embodiment, the first module comprises a plurality of fifth integrated connectors selectively located thereon, the fifth integrated connectors having a different configuration to both of the first integrated connectors and the third integrated connectors, and the second module comprises a plurality of sixth integrated connectors, the fifth integrated connectors registering with the sixth integrated connectors when the first module and the second module opposition with respect to each other in their assembled orientation.

Preferably, the integrated connectors are fixed and integral with the first module or the second module such that they cannot be removed from either of the first module or the second module.

In one embodiment, the insert slide portion is generally of a T-shaped structure, and the insert retainer comprises an open slot having inwardly directed flanges at the opening so as to receive and hold the T-shaped structure. Further, the open end of the insert retainer may receive the T-shaped structure, the open slot of the insert retainer being closed at its other end thereby providing a barrier to further movement of the insert slide portion within the insert retainer. There may be provided a releasable stop means for securing the inserts slide portion in the insert retainer when fully inserted therein.

In one form, the first integrated connector is one selected from a tubular extension having an insertion hole at one end thereof, an insertion post having a head at one end thereof, and an elongate insert portion; and the second integrated connector is one selected from an insert post, and insert slot, and an elongate insert retainer respectively. Further, a third integrated connector is provided which is different from the selected first integrated connector; and a fourth integrated connector is provided which is different from the selected second integrated connector. Still further, a fifth integrated connector is provided which is different from the selected first and third integrated connector; and a sixth integrated connector is provided which is different from the selected second and fourth integrated connector.

Preferably, the furniture piece comprises a plurality of modules, each of the modules having at least two different types of first integrated connector, and at least two different types of second integrated connector.

In accordance with the invention, there may be provided a first additional integrated connector and a second additional integrated connector, the first and second additional integrated connectors being utilized for releasably fastening one furniture piece to an adjacent furniture piece.

According to a further aspect of the invention, there is provided a method of constructing a modular furniture piece with integrated connectors, the method comprising: providing a first module having a plurality of first integrated connectors selectively located thereon; and providing a second module and fastening it to the first module, the second module having a plurality of second integrated connectors located thereon, the first integrated connectors registering with the second integrated connectors when the first module and the second module are positioned with respect to each other in their assembled orientation.

According to one aspect of the invention, there is therefore provided an item of furniture made up of modular components, each modular component comprising an integrated connector which engages with a corresponding integrated connector on an adjacent modular component to secure the modular components together. The connector may comprise a snap post received within a snap aperture. Further, the connection may comprise an insert portion which is slidably received within an insert retainer. Assembly of the modular components can be effected so that the item of furniture is constructed without the need for any external hardware or the use of any tools. Corresponding disassembly is also facilitated.

In other words, the mechanism for connecting one module of an item of furniture to another module thereof comprises features on such modules, and not separate therefrom, which engage and interact with each other so as to effect firm and stable connections, in addition to allowing disassembly of the item, when this may be required.

According to a further aspect of the invention, there is provided a method of manufacturing a modular furniture item with integrated fastening components so that the modules can be assembled without the use of external fasteners or tools.

According to yet a further aspect of the invention, there is provided a method of assembling an item of modular furniture, wherein each of the modules is provided with a fastening component which corresponds, registers and engages with a fastening component on the adjacent module to effect a rigid and stable connection between such modules.

The invention is thus for an item of furniture which may be comprised of parts or modules, wherein the parts or modules can be assembled into the full item of furniture without the need for any fastening hardware, or, indeed with respect to at least one aspect of the invention, the requirement for tools such as wrenches, screwdrivers or hammers, in order to assemble the furniture utilizing the fastening hardware.

In one embodiment, a furniture item in accordance with the present invention may comprise a plurality of injection molded parts, or parts produced by different processors, each of the parts having incorporated or integrated therein various snaps and inserts which mate and register with corresponding parts on another module in order to securely connect the modules to each other. The modules are therefore constructed with integrated forms of connection enabling adjacent modules to be snapped connected to each other simply by bringing a fasteners towards each other, and applying a generally moderate pressure to cause engagement between them. Corresponding disassembly may be carried out in the reverse process.

BRIEF DESCRIPTION OF THE DRAWINGS

In the drawings:

FIG. 10A, FIG. 10B and FIG. 10C illustrate a top perspective view, a bottom perspective view, and an exploded view respectively of a coffee table item of furniture constructed in accordance with the present invention;

DETAILED DESCRIPTION OF THE INVENTION

The invention is for a modular furniture item, which may be used either indoors or outdoors, which may be assembled without the use of fastening hardware or tools, and which have integrated components on the various modules which engage with related integrated components on other modules to securely fasten and hold each of the modules to each other in a stable and efficient manner.

Reference is now made to the accompanying drawings which show various items of furniture comprised of a plurality of modules, with each of the modules being connectable to each other to establish a fastening therebetween. The connectors between the modules may be the same from one item of furniture to another, so that a wide variety of different size and shape furniture may be assembled with different types of modules, but all of which utilize the preferred form of connection between modules, as described here in.

Figure 1:
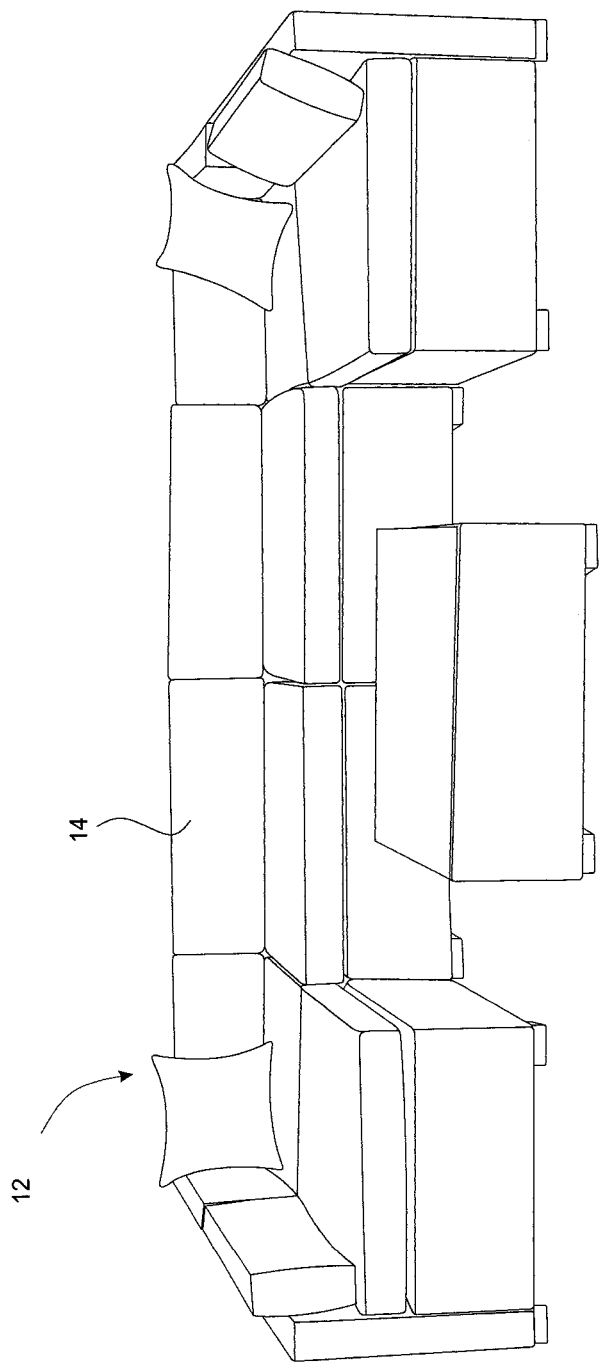
FIG. 1 of the drawings shows a perspective view of outdoor furniture comprised of modules, when fully assembled.

With reference now to FIG. 1 of the drawings, it will be seen that a U-shaped couch or sofa 12 is constructed out of modular components and assembled by appropriately orienting the modules relative to each other and fastening them together. The sofa 12 itself may comprise a series of single seats 14 which may be pushed adjacent to each other, and even releasably connected, so that a wide variety of combinations and configurations is available for the most desired and convenient use, as selected by the user. The couch 12 in this drawing has, as mentioned, discrete seats 14, and each of the seats 14 is comprised of panels and modules which are linked and fastened together to provide a secure seat, as will be described.

Figure 2:
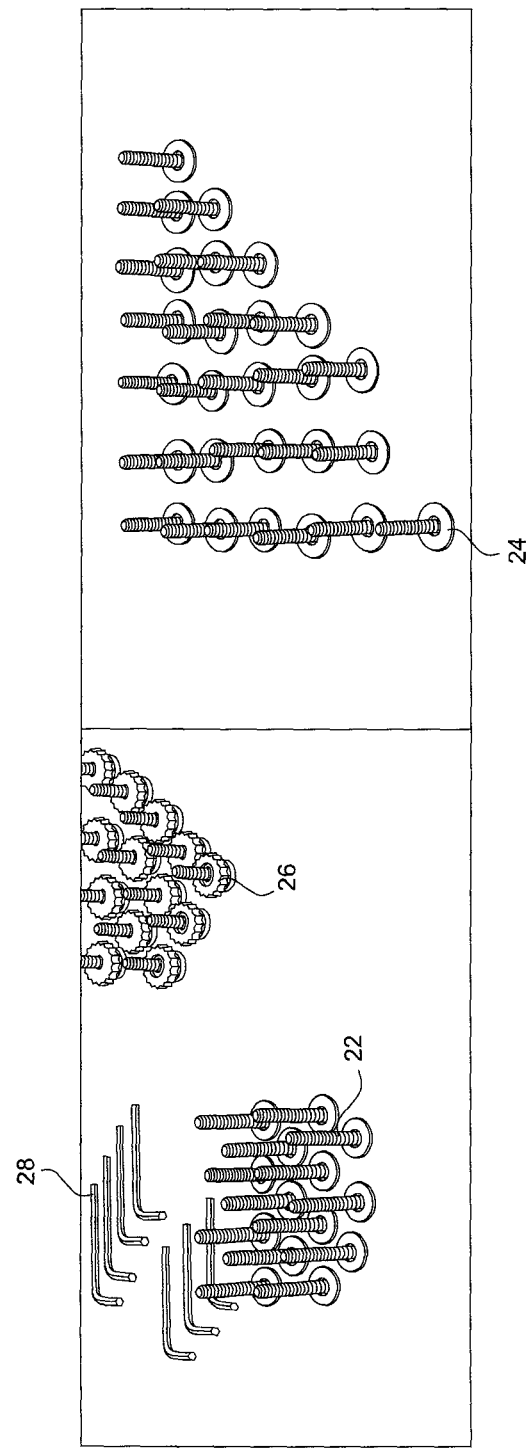
FIG. 2 shows a illustrative hardware which may be typically used for conventionally assembled furniture.

FIG. 2 of the drawings illustrates the types of fastening means which may typically be associated with a piece of furniture which has separate components to be assembled by the user, and utilized to link or connect different panels and components of such furniture to keep them together. Different types of screws 20, big 22 and small 24, as well as adjustable knobs 26, hex keys 28 and other tools and parts may be incorporated into a kit with a package which is sold and delivered with the disassembled item of furniture. The tools require a level of work to assemble the piece of furniture, and may lead to inconvenience and significant time delays if some of the hardware may be missing, lost or damaged, which prevents the piece of furniture from being properly assembled. Even the absence of a minor part can severely impact and ultimately prevent the construction of the entire piece.

The present invention preferably comprises injection molded components with inbuilt or integrated snaps and inserts to hold all parts of the furnished together, and potentially perform in a similar or even better manner than an assembled piece of furniture using hardware such as screws and bolts.

Figure 3:
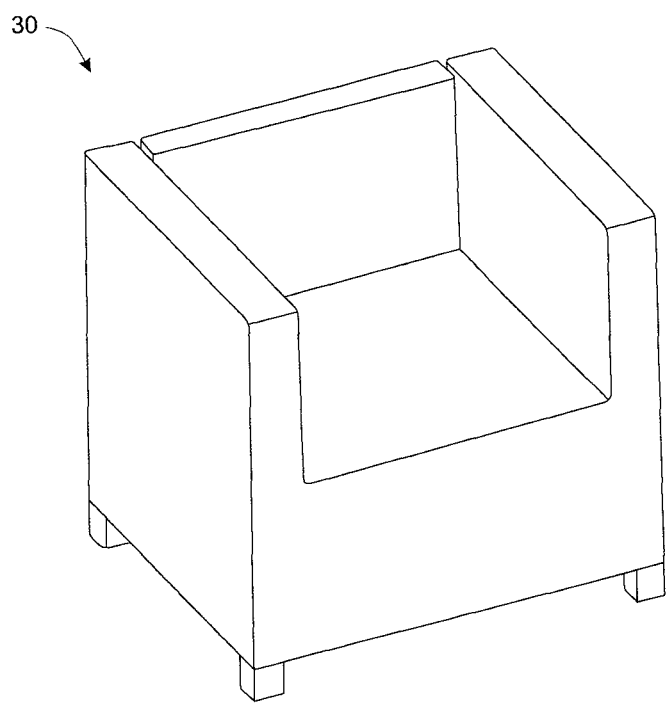
FIG. 3 shows a modular chair constructed and assembled in accordance with the present invention.

FIG. 3 of the drawings shows a chair 30, or club chair, which may be constructed and assembled in accordance with the present invention. This chair is designed in such a way that there is no requirement for the usage of any fasteners such as, but not limited to, metal and nonmetal type screws, bolts, nuts, washers, pins or clips. The chair illustrated in this figure is designed such that no hardware is necessary, and the modules each have fastening components which connect to each other in some way, and hold the chair 30 together securely without the need for any fasteners. Some of the figures below show detailed views of various parts and components used to assemble a club chair 30 piece of furniture as illustrated. At no point in the assembly are any bolts and nuts such hardware required, nor any tools, specialized or otherwise, to operate the fasteners.

Figure 4:
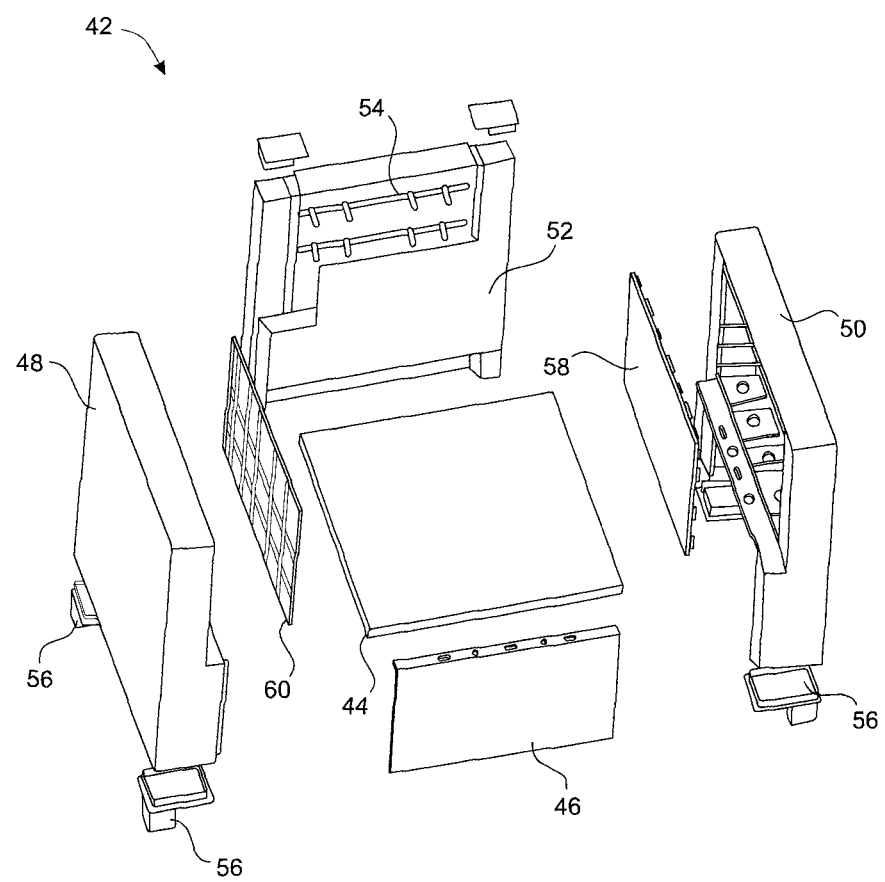
FIG. 4 shows a modular chair such as one shown in FIG. 3 of the drawings, in an exploded view showing the different modules and components thereof.

Reference is now made to FIG. 4 of the drawings, which may show a chair 42 of the type as illustrated in the previous figure, but in a disassembled and exploded view. The various parts and panels which make up the chair can be seen. Some of the components include a seat panel 44, a front panel 46, side panels 48 and 50, and a back panel 52. The back panel 52 may include an internal component 54, to facilitate the connection. Other panels may include similar such internal components, which may also operate as spacers. The chair 42 comprises four feet 56, which rest on the floor or surface. There may be additional components such as inner panels 58 and 60 for the side, and, as mentioned, internal spacers may be provided in the various panels to help to keep the various modules in the correct position. As will be appreciated, each of the panels need not simply be a flat one-dimensional component, but may have depth to provide the furniture with additional strength and aesthetics.

Each of the panels mentioned above is connected to its adjacent panel or panels, and there are generally two typical forms of connection for securing to modules or parts together, although the invention is not limited to these two methods. These may generally be described as a snap method of fastening on the one hand, and an insertion method of fastening on the other. Both will be described further below. Any item of furniture in accordance with the invention which is assembled using a plurality of panels would typically use both of these assembly or fastening mechanisms, and the position of connection, as well as the nature and function of the parts that are being connected, will have a type of connection which best suits the particular needs of the situation, and results in a secure and steady a chair.

Figure 5:
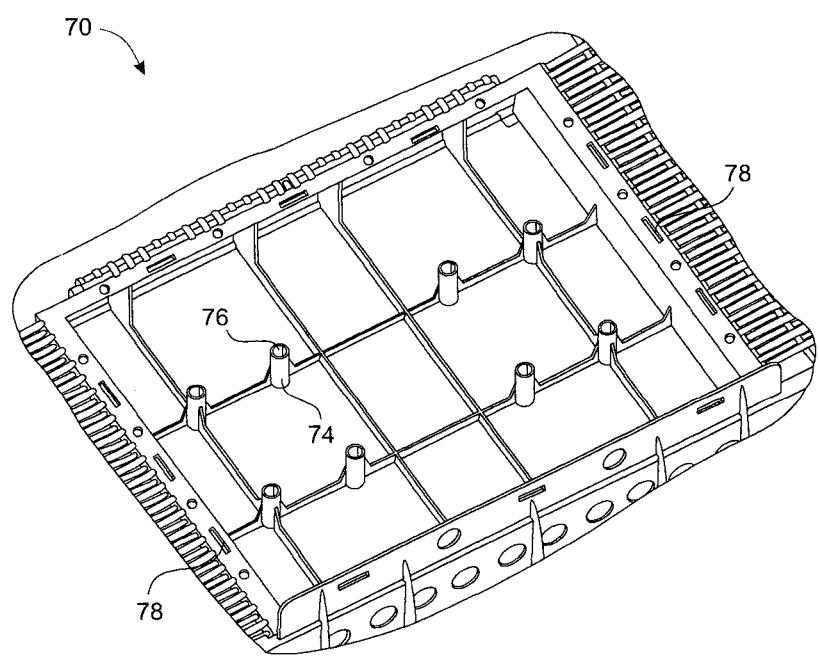
FIG. 5 shows one module of the furniture item illustrating integrated insertion holes and snap retainer slots in accordance with the invention.
Figure 6:
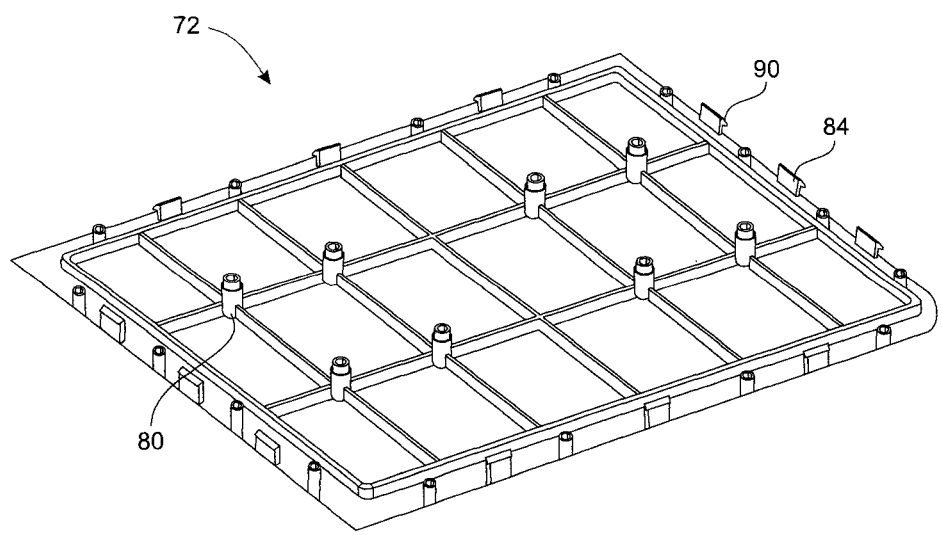
FIG. 6 shows a further module of the furniture item illustrating integrated insertion posts and snap posts in accordance with the invention.

FIGS. 5 and 6 of the drawings show two parts or modules which are joined together in accordance with the invention. These figures illustrate one of the connection mechanisms and methods, namely, the presence of a snap on one module which registers with and connects to an insertion hole on an adjacent module to which it is fastened. These are, for illustrative purposes, a first part 70 and a second part 72, as previously indicated. On the surface of part 70 in FIG. 5, it will be seen that there are rows of tubular extensions 74 which are hollow, and define insertion holes 76. Also on this part, there are rows of strategically positioned slots 78, which are generally (but not necessarily) rectangular structure. In FIG. 6 of the drawings, it will be seen that there are rows of insertion posts 80, and these correspond in position to the tubular extensions 74 with insertion holes 76 as shown in FIG. 5. FIG. 6 also shows the presence of the snap posts 84, and these correspond in position to the snap or retainer slots 78 in the module comprising the first part 70 illustrated in FIG. 5. It will be readily appreciated that the first part 70 and the second part 72, comprising two modules or components, can be easily placed adjacent to each other, and fastened to each other together to securely construct the desired piece of furniture. Each one of the insertion posts 80 as shown in FIG. 6 is guided into its corresponding insertion hole 76 which are present in the tubular extensions 74 as shown in FIG. 5 of the drawings. It will be seen that there are multiple tubular extension 74 arranged over the area of the first part 70, to provide an extensive and firm connection. The tubular extensions 74 may be more closely spaced together in areas likely to bear more weight, and vice versa. Therefore, a particular item of furniture will have its tubular extensions 74, and the corresponding insertion posts 80, configured for maximum effectiveness when fastening, and the ability to sustain a selected load.

In a preferred embodiment of the invention, the snap post 84 includes a head 90 which has an entry angle, or is made to taper in the form of an inclined plane, for ease of inserting into the retainer slots 78. Therefore, the end-user may use minimum or just moderate hand force to push the snap post 84 into the retainer slot 78. By this method, the use of external tools and any other hardware is avoided.

The modules illustrated in FIGS. 5 and 6 show two methods of connection. The snap post 84 and corresponding slot 78 are used at or near the periphery of the module, while the insert post 80 and the tubular extensions 74 with insertion hole 76 are selectively spaced towards the inside of the module. These effectively connect the modules together without the need for any other hardware or tools required for the task.

As mentioned, only a small force of the hand is required so that the snap post 84 is placed within and retained by the slot 78. This allows the assembly to be secure and rigid. There are multiple snap posts 84 on any part of the module so that when assembled, it gives considerable strength, possibly even more so than the use of conventional external fasteners. It will, of course, be noted that the number of snap posts 84 and insertion posts 76 can be increased in number or decreased in number according to their position on the furniture, and the load that they are likely to support. When nothing more than a simple connection is required, fewer such insertion posts 76 and snap posts 84 may be used. However, when the respective modules are load-bearing, or may be subjected to considerable stresses and forces, such as with a chair or storage item, the number of insertion posts 80 and snap posts 84 can be increased to any degree in order to ensure that the assembled furniture is strong, and remains rigid.

The drawings in FIGS. 5 and 6 show insertion posts 80 and snap posts 84 of a particular shape and size, but it is important to note that the invention is not limited to these types of shapes, dimensions and configurations. Any desired shape, or a mix of shapes, can be used to achieve the purpose of properly installing the modules and providing a chair which is strong and able to provide the necessary supports.

The chair can, of course, be disassembled from its assembled position, and this is achieved by the end-user of consumer pushing the snap posts 84 manually so as to free them from the snap or retainer slots 78. Once more, tools are not necessary to achieve this purpose. Preferably, they will be adequate access to both sides of the peripheral edge in which the slots 78 are located so that a user can reasonably conveniently apply the necessary force to the snap posts 84, once inserted in the slots 78, to remove them.

Figure 7:
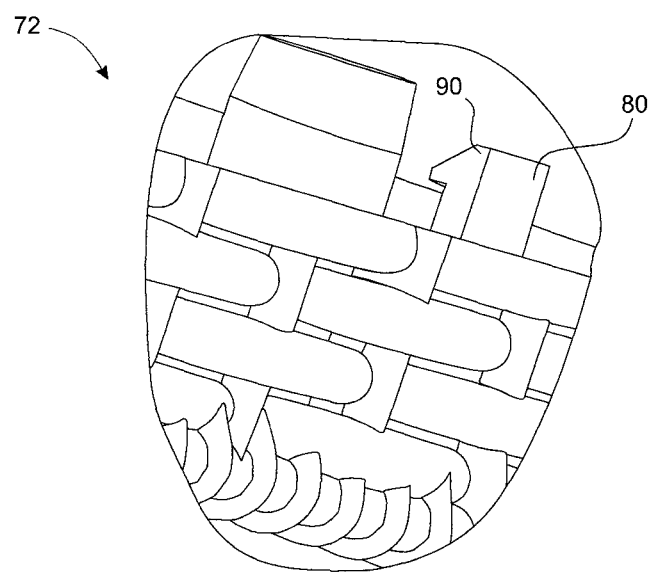
FIG. 7 and FIG. 8 illustrate in further detail the structure of a snap post and corresponding slot in accordance with one aspect of the invention.
Figure 8:
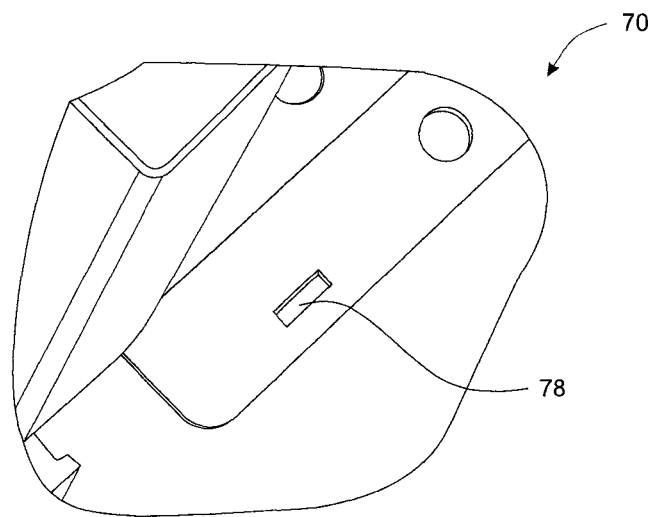

With reference to FIGS. 7 and 8 of the drawings, a more detailed illustration of the snap post 80, as in FIG. 7, and the snap post retainer slot 78, as in FIG. 8, is illustrated. The configuration of the snap post 80 includes structure with an incline 90, so that as the inclined surface 90 slides through the retainer slot 78, the snap post 80 is pushed slightly in a rearward direction until the snap post 80 is inserted to the slot a sufficient distance, and then snaps forward again to engage the surface around the snap post retainer slot 78. A strong and secure connection is thus made. Since there are multiple snap posts 80 located at strategic points of connection between adjacent modules, the plurality of such connections adds up to a very effective connection, possibly considerably more so than the more limited number of external fasteners which may otherwise be used in conventional assemblies, allowing the modules to remain rigid and fixed to each other.

Disassembly of adjacent and connected components can be made by appropriately pressing the snap post 80 slightly rearwardly so as to allow it out of the snap post retainer slot 78. Multiple assemblies and disassemblies may be carried out, as desired, so that the furniture item can be respectively constructed for use when required or compacted when needed for storage and transportation.

Figure 9:
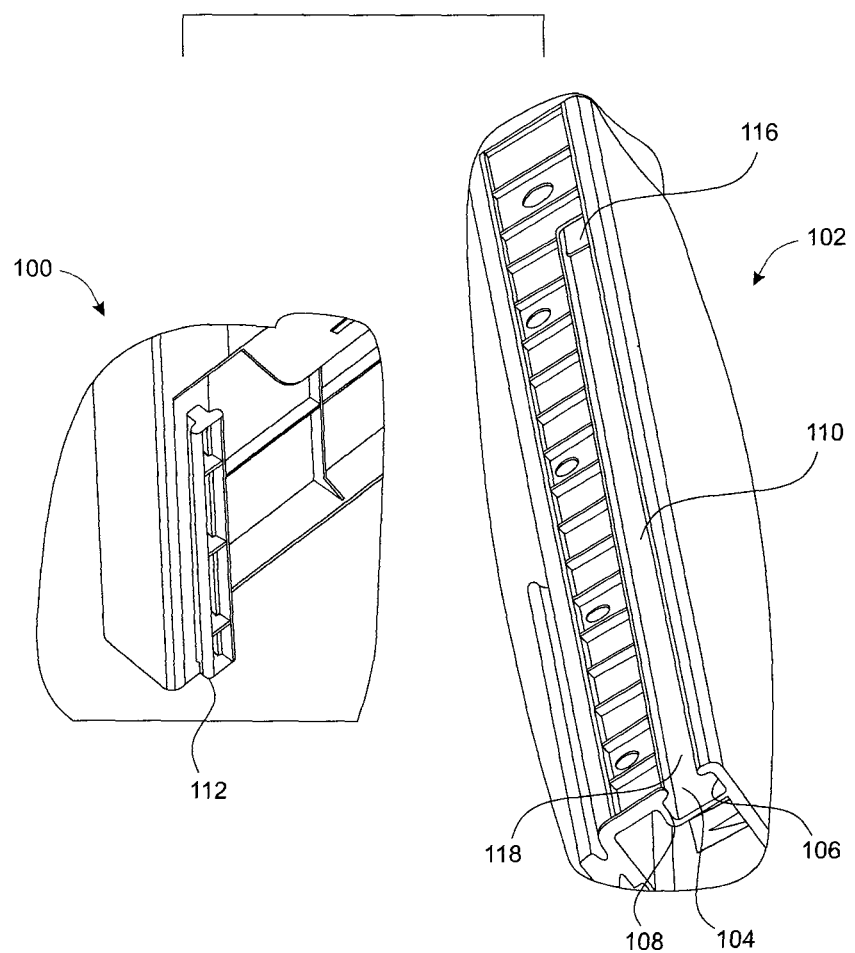
FIG. 9 shows two modules of a furniture item in accordance with the invention for connection by the insertion method and comprising an insert on one module and an insert retainer on the other module.

Reference is now made to FIG. 9 of the drawings, which shows, for example, the connection of a first part 100 and a second part 102, comprising separate and adjacent modules of the furniture item is to be fastened together. These figures illustrate what may be referred to as the insertion method, comprising a slot and track arrangement. It will be seen that the second part 102 has along its edge and insert retainer 104, including a radiused upper end 106 and radiused lower end 108. The insert retainer 104 or slot has an open end 110, for slidably receiving the insert portion 112 of the first part 100. One end of the insert portion 112 is inserted at the radiused opening 110 into the insert retainer 104, and the first part 100 and the second part 102 are slidably moved relative to each other until the insert portion 112 is fully received within the insert retainer 104. A very effective form of connection is thus established. The connection is not just at specific points, but at all points along the length.

It will be appreciated that the insert portion 112 is a feature or component which is integrated into the main part of the module or first part 100. It is a rigid structure which can carry a significant number of pounds of load, or support a significant force, without any significant yielding. This form of connection is able to replace fasteners such as bolts, screws etc. as mentioned above, and the connection is designed in such a way that the edges 106 and 108 are radiused to ensure that there is no or minimal stress concentration which may result in premature failures.

The insert portion 112 feature also acts as a guide for assembling to the mating parts 100 and 102. It will be seen that the insert portion 112 has a T-shaped configuration in cross-section, and is able to withstand both compression as well as tensile loads. This T-shaped cross-section construction is not the only shape that may be used in this invention, but any other effective shape which has the ability to connect in a suitable manner may be used. Another such example is an I-shaped cross-section insert portion, which may also be of sound mechanical efficiency.

The second part 102 shown in FIG. 9 further has a receiving feature for the insert portion 112, referred to as the insert retainer 104. The insert retainer 104 is closed at one end 116, an open at the other end 118. The open end 118 of the insert retainer 104 is the means by which the insert portion 112 is accommodated and installed therein. The closed end 116 provides a stop for the insert portion 112, to ensure that it is probably located within the insert retainer 104. The insert retainer 104 feature is thoroughly and effectively internally radiused, to act as a load-bearing surface.

Various mechanisms and structures may be so as to retain the insert portion 112 within the insert retainer 104, so that it is secure therein, and will not slide out. In some circumstances, depending upon the construction of the furniture piece, other modules may cover the open end 118 of the insert retainer 104, effectively preventing the insert portion from sliding out. However, the insert portion 112 and/or insert retainer 104 may also include structures, such as of the snap post type referred to above, or protrusion in a recess, to help keep the insert portion 112 within the insert retainer 104 so that it will remain in position and be prevented from sliding therein. These are just examples, and many other mechanisms may be used, and will form a part of this invention.

Upon assembly, the unit would thus be able to withstand several pounds of load without straining or collapsing, and may further be able to handle forces and stresses which other fasteners would not. One of the reasons for this is the ability of all fasteners to undergo torsional stresses as they are tightened. Further, there is the additional stress due to load, which can sometimes be substantial. These stresses can cause premature failure.

The present invention is able to effectively provide many more connecting points and connecting surfaces without adding any complexity to assembly, since the connections are structured so as to automatically engage and attach to each other. In more conventional furniture assembly systems, where hardware and fastening tools are required, there is perhaps an inclination to reduce the number of fasteners to avoid too much complexity in the assembly. The present invention, and the method of connection described therein, effectively avoids this situation.

The type of connection between modules used between any selected pair of modules will, of course, be chosen according to the nature of the construction. They may be some modules which are not suited for the insert retainer and insert portion type of connection, since it may not be feasible to slide such adjacent modules relative to each other during the connection process.

In FIGS. 10A, 10B and 10C of the drawings, there is shown a coffee table 130, in top perspective, bottom perspective, and exploded views respectively. The square coffee table 130 includes nine parts. These include four pieces of the side edge 132, four pieces of the corner or edge 134, and a central portion 136. The side edge portion 132 are assembled by the insertion method as previously described, while the central portion 136 is assembled securely onto the corner or edge pieces 134 by the snap and insert method, as also explained and described previously. The square coffee table 130 once assembled as required zero fasteners, other than the integrated fastening mechanism on the parts themselves, and uses the different types of connector systems as set forth herein, allowing the assembly of a rigid and secure coffee table 130 which is able to bear substantial loads and stresses.

Figure 11:
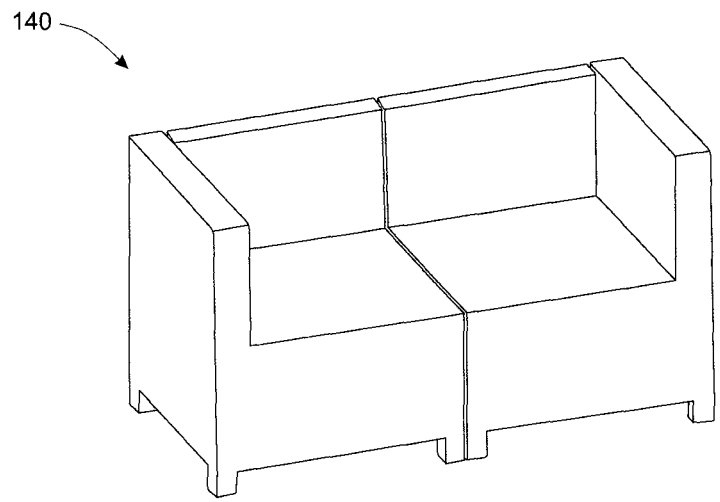
FIG. 11 illustrates a modular love seat constructed and assembled in accordance with one embodiment of the invention.
Figure 12:
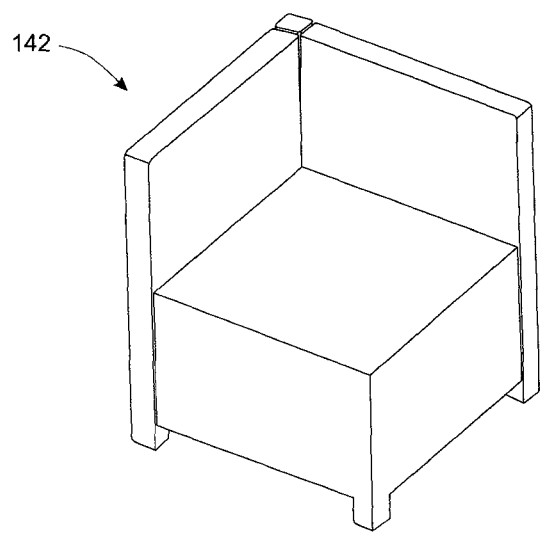
FIG. 12 illustrates a modular corner chair constructed and assembled in accordance with one embodiment of the invention.
Figure 13:
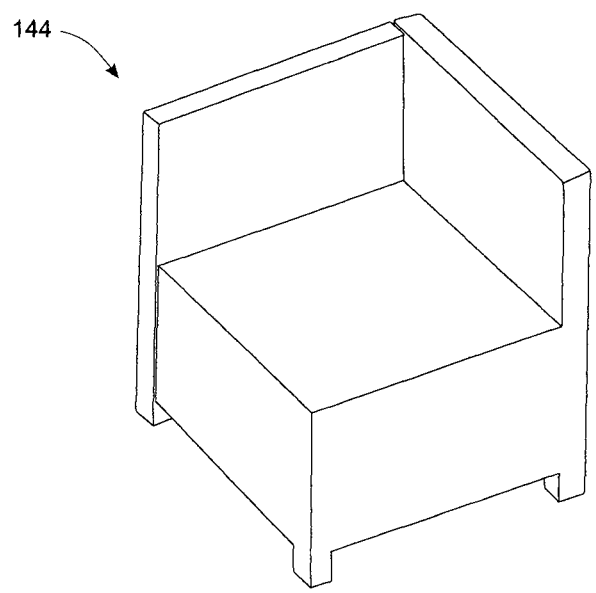
FIG. 13 illustrates a modular right arm rest chair constructed and assembled in accordance with one embodiment of the invention.
Figure 14:
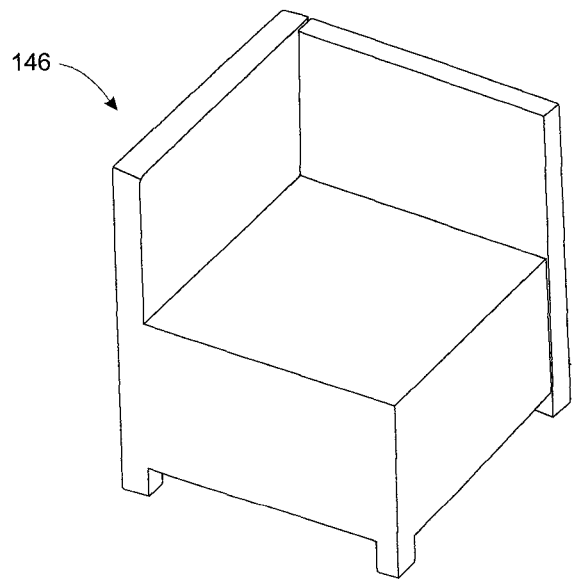
FIG. 14 illustrates a modular left arm rest chair constructed and assembled in accordance with one aspect of the invention.
Figure 15:
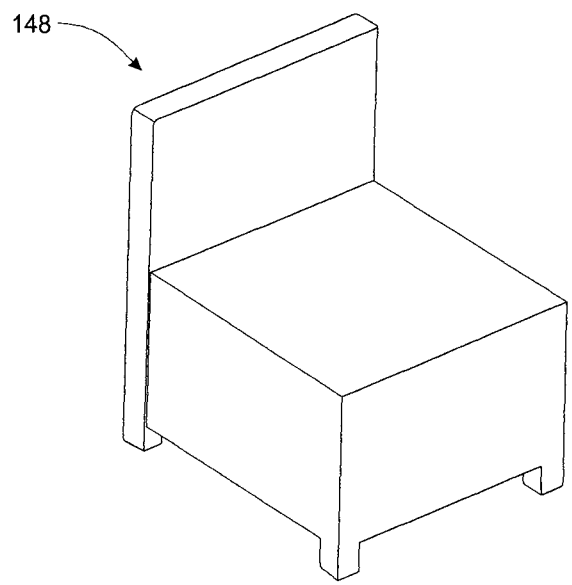
FIG. 15 illustrates a modular armless chair constructed and assembled in accordance with one aspect of the present invention.
Figure 16:
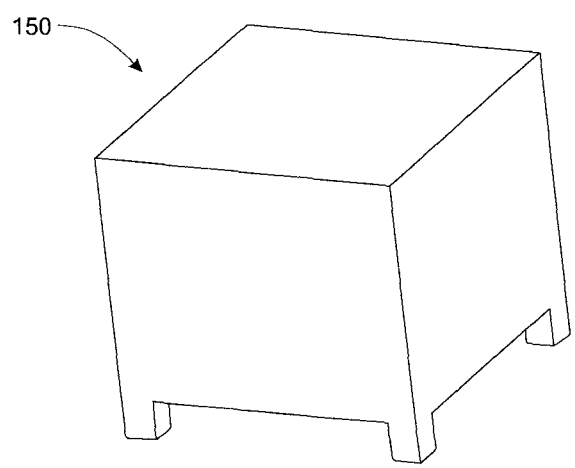
FIG. 16 illustrates a modular accent table constructed and assembled in accordance with one aspect of the present invention.
Figure 17:
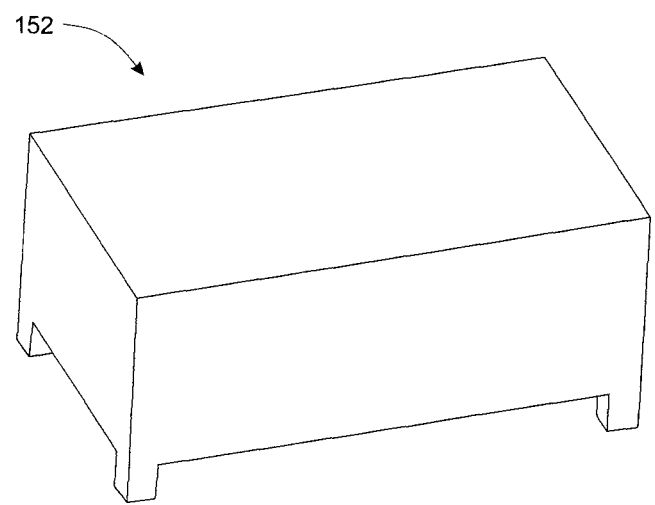
FIG. 17 illustrates a modular rectangular coffee table constructed and assembled in accordance with one aspect of the present invention.

FIGS. 11 to 17 show illustrative examples of furniture types which may be provided in modular form, and wherein the modules are assembled by the end user or consumer using the fastening mechanisms described herein. FIG. 11 of the drawings shows a loveseat 140 with the various modules and panels assembled in accordance with the invention. FIG. 12 shows a corner chair configuration 142, FIG. 13 illustrates a right armrest 144, while FIG. 14 illustrates a left armrest 146. FIG. 15 shows an armless chair 148 of the invention, while FIG. 16 shows an accent table 150 constructed in accordance with the invention. One final example seen in FIG. 17 is a rectangular coffee table 152, constructed in accordance with the invention.

Figure 18A:
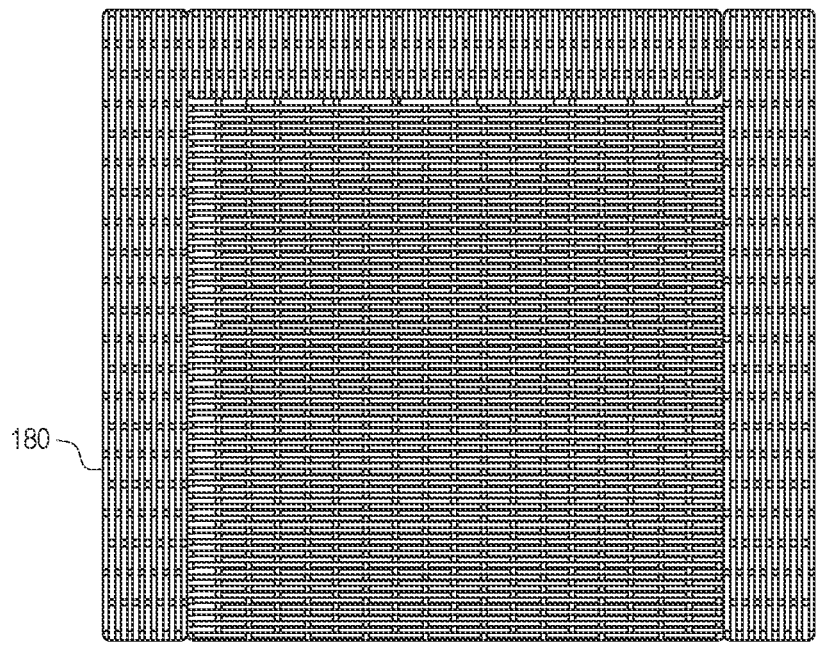
FIGS. 18A and 18B are top and front views respectively of a modular chair constructed in accordance with one aspect of the invention.
Figure 18B:
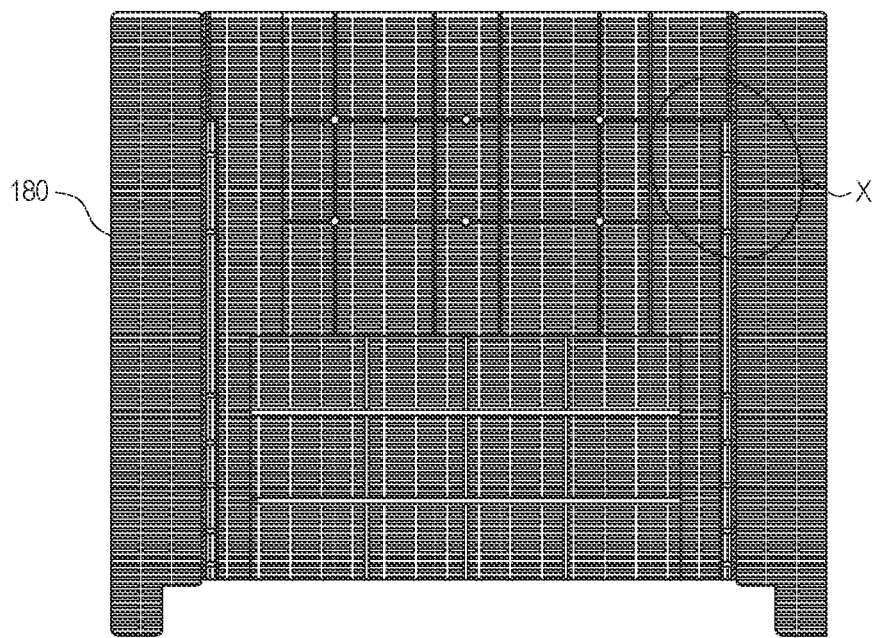
Figure 18C:
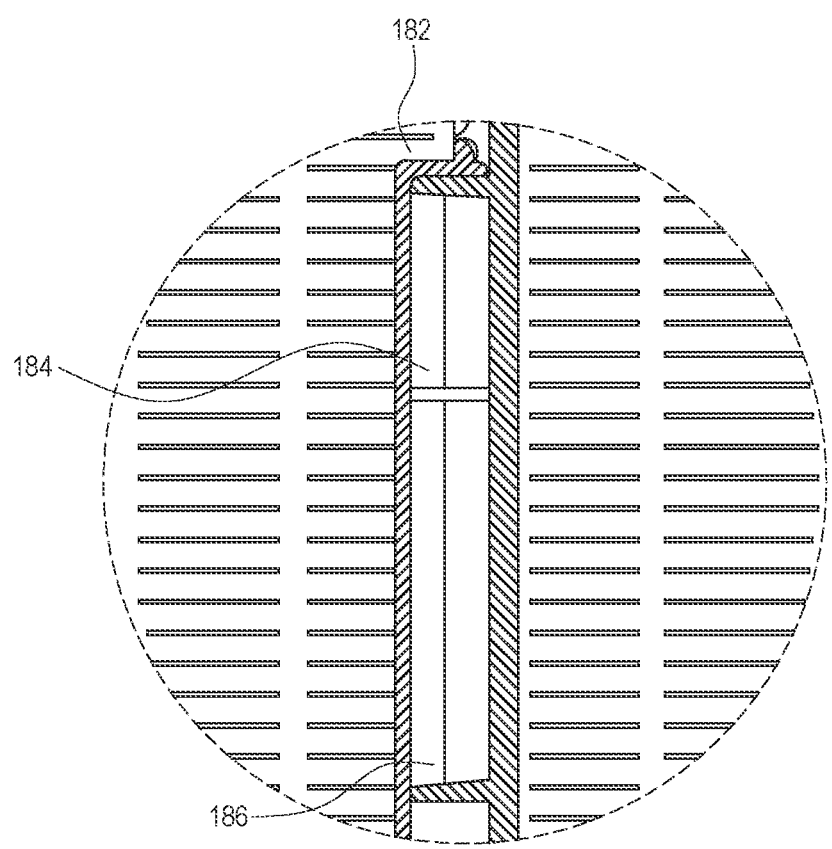
FIG. 18C is a detail view of the circle portion designated X in FIG. 18B of the drawings.

Reference is now made to FIGS. 18A to 19E of the drawings showing another embodiment of a modular chair and the forms of connection that may be established to secure portions and panels thereof together in a secure, stable and easy manner. FIGS. 18A and 18B show a top and front view respectively of a modular chair 180 whereby panels are connected together as shown using fastening means as set out in the drawings and as described herein. FIG. 18C shows a detail of the fastening mechanisms of two panels of the chair 180, the detail illustrating the chair 180 as illustrated in the circle designated with X in FIG. 18B of the drawings. At one point, there is illustrated a slot and slide construction 182, while registering connections and areas are shown at the area 184 and 186.

In the above figures, parts are inserted in such a way to facilitate a self-locking connection due to the feature where the insert area has a defined angle which creates a self-locking mechanism. As regards FIG. 18C, this figure shows that there are two features where a different part or portion has an angle which creates a self-locking mechanism. The radius at the top corner shown in this figure creates a support which gives stability against just about any anticipated load. All of the parts when assembled will create a self-locking assembly.

Figure 19A:
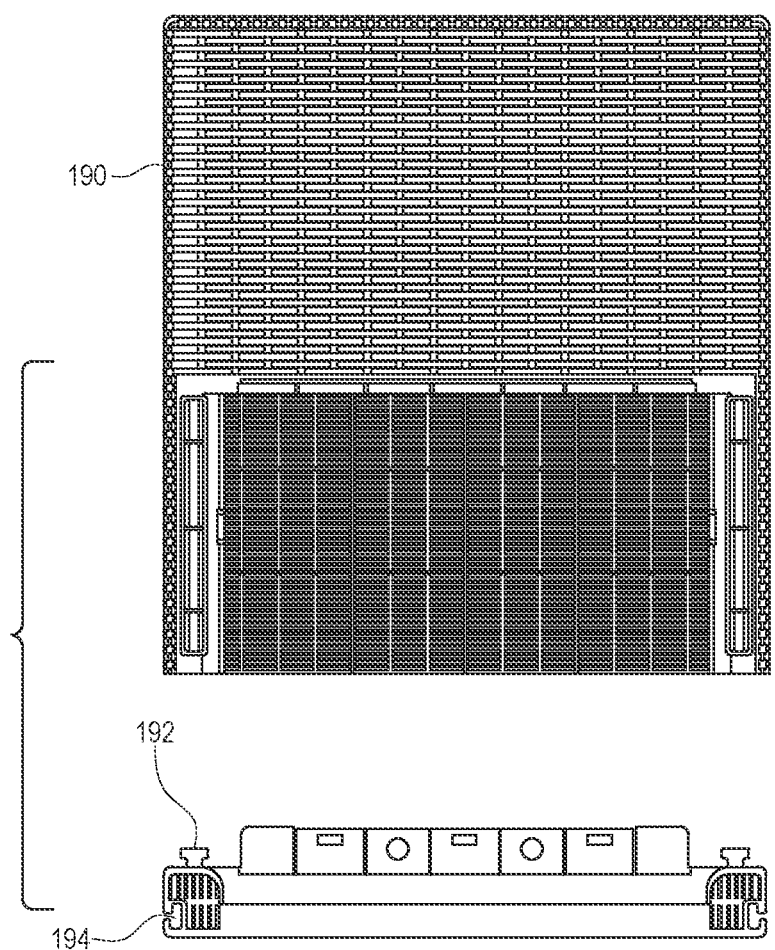
FIG. 19A is a top view and end view respectively of a panel for use with a modular chair constructed in accordance with one aspect of the present invention.
Figure 19B:
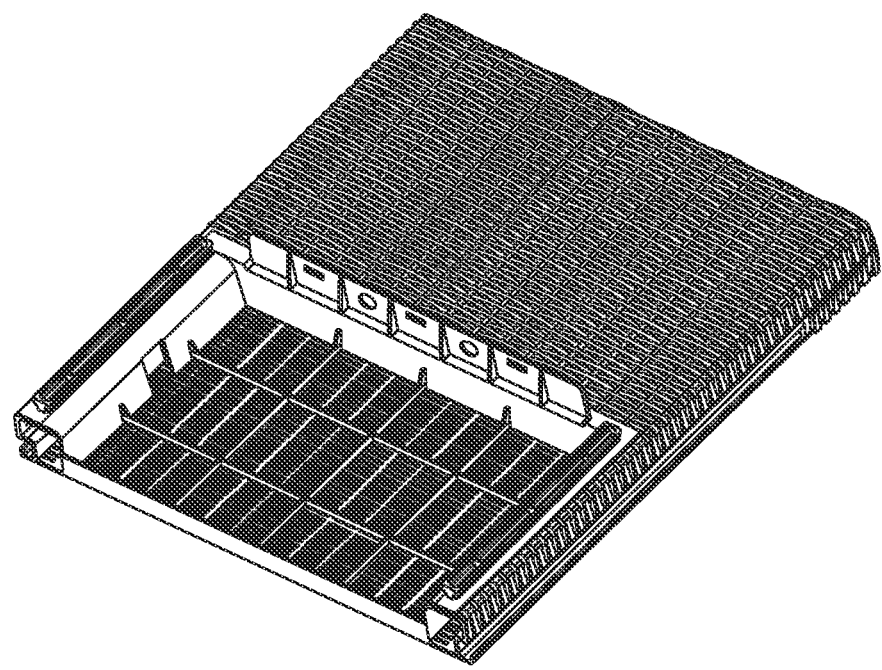
FIG. 19B is a perspective view of the panel for a modular chair as shown in FIG. 19A.
Figure 19C:
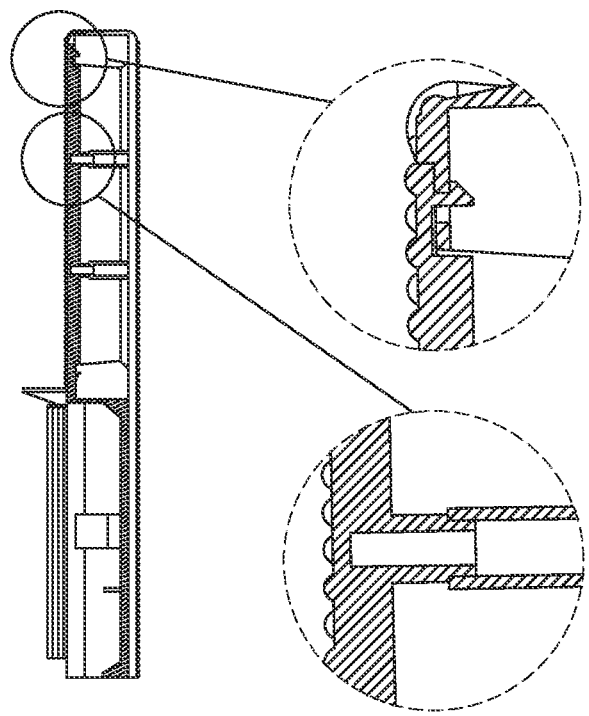
FIG. 19C is an end view cross section showing connection of the parts with a detail of each of the connections in the respective circle.
Figure 19D:
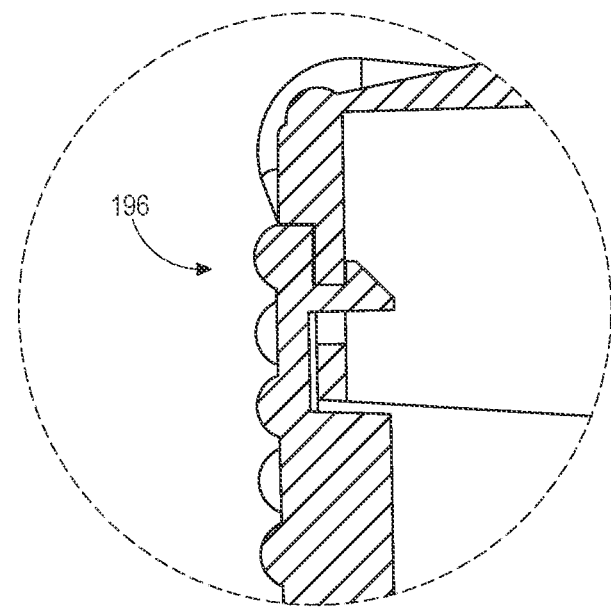
FIGS. 19D and 19E are enlarged views of the circled views as illustrated in FIG. 19C showing the connection construction details.

FIG. 19A of the drawings shows a top view and an end view of a portion of a modular chair 190 in accordance with one aspect of the invention. The figure shows a rail slide 192 and a rail slot 194. Corresponding and matching slots and slides engage with each other to form a connection. FIG. 19D shows a detail of the connections including a snap tab and aperture combination and another detail of the connection including a male and female component set 198 which engage each other.

Figure 19E:
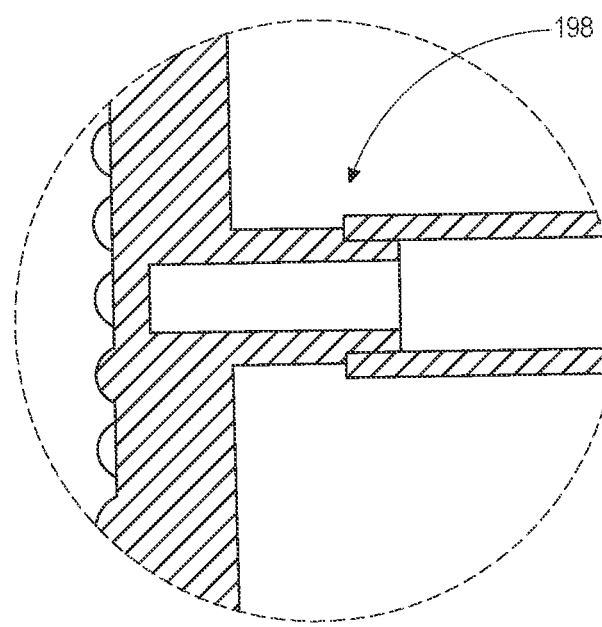

In FIGS. 19A to 19E, when the two parts are assembled, a locking mechanism described as a snap and retainer joint is used, as seen in FIG. 19D. This is like the T-shaped feature which enters into a mating part with a rectangular or circular or other shaped hole, and thereby forms a self-locking assembly. The radius and the angle may be selected so as to give the assembled panels the ability to withstand a desired or anticipated load. There is a post and socket assembly, which helps to align the parts before they are locked together either by a self-locking mechanism or by snap and retainer assembly. In FIG. 19E, it can be seen that the post or male component is located on one member of the assembly and the socket or female component is created on the mating part of the assembly. The post has a reduced feature or circumference at the entry point which allows it to enter into the socket. The step creates a support to withstand any compressive and tensile load.

It should be appreciated that the invention is not limited to these types or shapes of furniture. The important points to note is that the furniture is comprised of modules or parts which are sold and transported in a broken down condition typically for assembly by the end-user, and these modules have integrated constructional features which are formed during the manufacturing process, and which allow adjacent modules to be connected without the use of external fasteners, hardware, or other tooling which may be required in more conventional versions of modular furniture.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A modular furniture piece with integrated connectors, the modular furniture piece comprising:
a first module having a plurality of first integrated connectors selectively located thereon;

a second module for fastening to the first module, the second module having a plurality of second integrated connectors located thereon, the first integrated connectors registering with the second integrated connectors when the first module and the second module are positioned with respect to each other in their assembled orientation, the first and second integrated connectors being selected from one of a snap tab/aperture connector and a post/socket connector; and wherein the modular furniture piece comprises a furniture piece selected from one of: a coffee table, a loveseat, a chair, a table.

2. A modular furniture piece as claimed in claim 1 wherein the first module comprises a plurality of third integrated connectors selectively located thereon, the third integrated connectors having a different configuration to the first integrated connectors, and the second module comprises a plurality of fourth integrated connectors, the third integrated connectors registering with the fourth integrated connectors when the first module and the second module are opposed to each other in their assembled orientation.

3. A modular furniture piece as claimed in claim 2 wherein the first module comprises a plurality of fifth integrated connectors selectively located thereon, the fifth integrated connectors having a different configuration to both of the first integrated connectors and the third integrated connectors, and the second module comprises a plurality of sixth integrated connectors, the fifth integrated connectors registering with the sixth integrated connectors when the first module and the second module are opposed to each other in their assembled orientation.

4. A modular furniture piece as claimed in claim 3 wherein the integrated connectors are fixed and integral with the first module or the second module such that they cannot be removed from either of the first module or the second module.

5. A modular furniture piece as claimed in claim 1 wherein the first integrated connector comprises a tubular extension extending outwardly from the first module and having a free end, the tubular extension having an insertion hole at its free end, and the second integrated connector comprises an insertion post extending outwardly from the second module and having a free end, the free end of the second integrated connector having a post sized and configured so as to be received within the insertion hole of the first integrated connector to thereby form the post/socket connector.

6. A modular furniture piece as claimed in claim 1 wherein the first integrated connector comprises a tab extending outwardly from the first module and having a free end, the tab having an inclined head at its free end, and the second integrated connector comprises a slot formed within the second module, the free end of the tab being sized and configured so as to be received within the slot of the second integrated connector to thereby form the snap tab/aperture connector.

7. A modular furniture piece as claimed in claim 1 wherein the first integrated connector comprises a longitudinal insert slide portion extending outwardly from the first module and having opposing ends, and the second integrated connector comprises a longitudinal insert retainer extending outwardly from the second module and having an open end, the insert slide portion of the first integrated connector being configured so as to be received within the insert retainer of the second integrated connector to thereby form the post/socket connector.

8. A modular furniture piece as claimed in claim 7 wherein the insert slide portion is generally of a T-shaped structure, and the insert retainer comprises an open slot having inwardly directed flanges at the opening so as to receive and hold the T-shaped structure.

9. A modular furniture piece as claimed in claim 8 wherein the open end of the insert retainer receives the T-shaped structure, the open slot of the insert retainer being closed at its other end thereby providing a barrier to further movement of the insert slide portion within the insert retainer.

10. A modular furniture piece as claimed in claim 9 further comprising releasable stop means for securing the insert slide portion in the insert retainer when fully inserted therein.

11. A modular furniture piece as claimed in claim 1 wherein:
the first integrated connector is one selected from a tubular extension having an insertion hole at one end thereof, an insertion post having a head at one end thereof, and an elongate insert portion; and
the second integrated connector is one selected from an insert post, and insert slot, and an elongate insert retainer respectively.

12. A modular furniture piece as claimed in claim 11 wherein:
a third integrated connector is provided which is different from the selected first integrated connector; and
a fourth integrated connector is provided which is different from the selected second integrated connector.

13. A modular furniture piece as claimed in claim 12 wherein:
a fifth integrated connector is provided which is different from the selected first and third integrated connector; and
a sixth integrated connector is provided which is different from the selected second and fourth integrated connector.

14. A modular furniture piece as claimed in claim 1 comprising a plurality of modules, each of said modules having at least two different types of first integrated connector, and at least two different types of second integrated connector.

15. A furniture piece as claimed in claim 1 having a first additional integrated connector and a second additional integrated connector, the first and second additional integrated connectors being utilized for releasably fastening one furniture piece to an adjacent furniture piece.

16. A method of constructing a modular furniture piece with integrated connectors, the method comprising:
providing a first module having a plurality of first integrated connectors selectively located thereon;
providing a second module and fastening it to the first module, the second module having a plurality of second integrated connectors located thereon, the first integrated connectors registering with the second integrated connectors when the first module and the second module are positioned with respect to each other in their assembled orientation; and
wherein the furniture piece is selected from one of: a coffee table, a loveseat, a chair, a table.

17. A method as claimed in claim 16 wherein the integrated connectors are manufactured so as to fixed and integral with the first module or the second module such that they cannot be removed from either of the first module or the second module.

18. A method as claimed in claim 16 wherein the first module is constructed with a plurality of third integrated connectors selectively located thereon, the third integrated connectors having a different configuration to the first integrated connectors, and the second module is constructed with a plurality of fourth integrated connectors, the third integrated connectors registering with the fourth integrated connectors when the first module and the second module are in opposition with respect to each other in their assembled orientation.

19. A method as claimed in claim 16 wherein the first module is constructed with a plurality of fifth integrated connectors selectively located thereon, the fifth integrated connectors having a different configuration to both of the first integrated connectors and the third integrated connectors, and the second module is constructed with a plurality of sixth integrated connectors, the fifth integrated connectors registering with the sixth integrated connectors when the first module and the second module are in opposition with respect to each other in their assembled orientation.

\* \* \* \* \*